United States Patent
Itoh et al.

(10) Patent No.: US 7,948,579 B2
(45) Date of Patent: May 24, 2011

(54) PLANAR LIGHTING DEVICE AND LIQUID CRYSTAL DISPLAY DEVICE USING THE SAME

(75) Inventors: Tatsuo Itoh, Osaka (JP); Tetsuro Mizushima, Osaka (JP); Kenichi Kasazumi, Osaka (JP); Kazuhisa Yamamoto, Osaka (JP); Shinichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 76 days.

(21) Appl. No.: 12/179,906

(22) Filed: Jul. 25, 2008

(65) Prior Publication Data
US 2009/0027587 A1    Jan. 29, 2009

(30) Foreign Application Priority Data
Jul. 26, 2007    (JP) ................................. 2007-194177

(51) Int. Cl.
*G02F 1/1335* (2006.01)
*G02B 6/00* (2006.01)
*H02B 5/00* (2006.01)

(52) U.S. Cl. ............................. 349/61; 361/612; 385/147

(58) Field of Classification Search .................... 385/14, 385/15, 99, 101, 125, 147; 349/56, 57, 61, 349/62; 362/31, 612, 553, 339, 27
See application file for complete search history.

(56) References Cited

U.S. PATENT DOCUMENTS

| | | | | |
|---|---|---|---|---|
| 6,474,826 | B1* | 11/2002 | Tanaka et al. | 362/612 |
| 2003/0071934 | A1* | 4/2003 | Saccomanno et al. | 349/61 |
| 2003/0090887 | A1* | 5/2003 | Igarashi et al. | 362/31 |
| 2004/0170011 | A1* | 9/2004 | Kim et al. | 362/31 |
| 2007/0086712 | A1* | 4/2007 | Shani | 385/101 |

FOREIGN PATENT DOCUMENTS

| | | |
|---|---|---|
| JP | 05-210017 | 8/1993 |
| JP | 2004-226709 | 8/2004 |
| JP | 2005-038643 | 2/2005 |
| JP | 2005-043717 | 2/2005 |
| JP | 2005-064163 | 3/2005 |
| JP | 2005-258052 | 9/2005 |
| JP | 2006-134720 | 5/2006 |

* cited by examiner

*Primary Examiner* — Akm E Ullah
(74) *Attorney, Agent, or Firm* — Wenderoth, Lind & Ponack, L.L.P.

(57) ABSTRACT

An optical fiber of which one end is optically coupled to a laser light source propagating, from the one end to other end, a laser light emitted from the laser light source. A light-guiding plate includes a light-guiding section in which a plurality of right prisms of the same shape for extracting the laser light by contacting the optical fiber are arranged parallel to each other in the same direction at equal intervals. A planar section diffuses the laser light extracted from the light-guiding section and emits the diffused laser light from one main surface. The optical fiber is bent more than twice to form a plurality of straight line portions arranged parallel to each other at unequal intervals, and the optical fiber and the light-guiding plate are positioned such that the laser light is extracted at equal intervals from each of the plurality of straight line portions.

13 Claims, 12 Drawing Sheets

F I G. 1 B
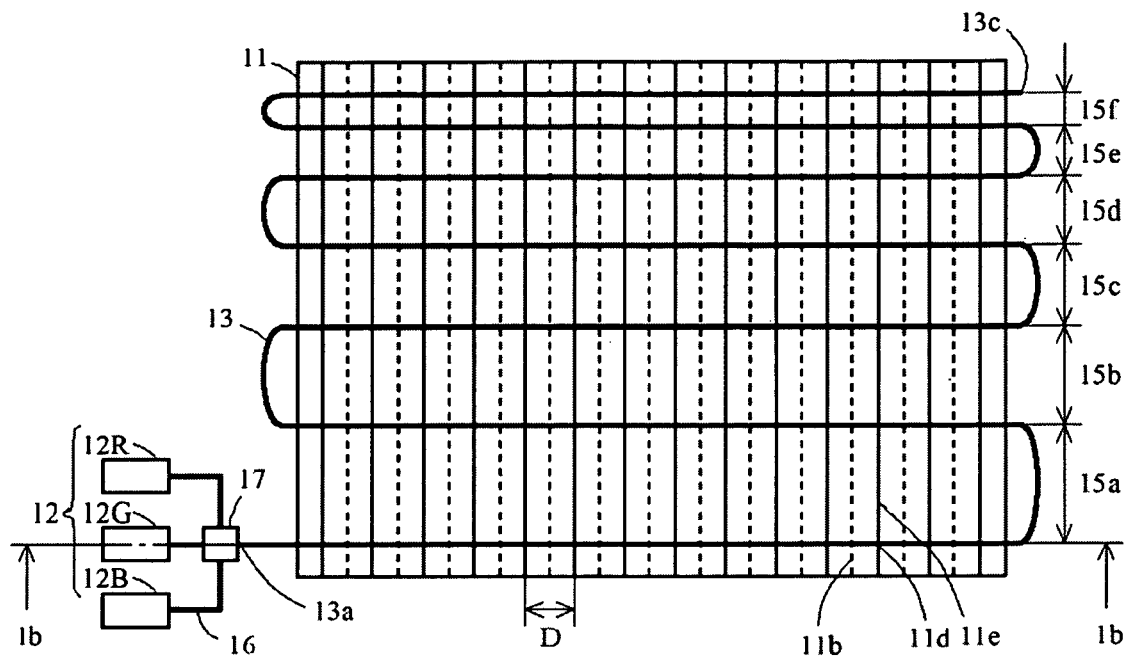
F I G. 1 C
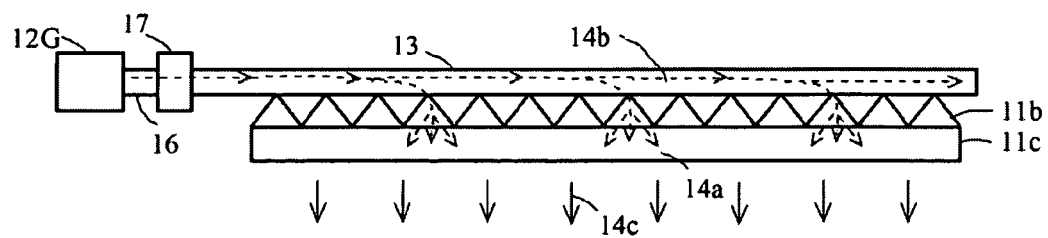

PLANAR LIGHTING DEVICE AND LIQUID CRYSTAL DISPLAY DEVICE USING THE SAME

BACKGROUND OF THE INVENTION

1. Field of the Invention

The present invention relates to a high-brightness planar lighting device using a laser light source used for a non-self-luminous display device such as a liquid crystal television, and to a liquid crystal display device using the high-brightness planar lighting device.

2. Description of the Background Art

A liquid crystal display device displays an image by controlling the amount of transmission of the light illuminated from the back side, using the electro-optic effect due to the orientation of liquid crystal molecules. Accordingly, the liquid crystal display device requires a planar lighting device referred to as a backlight unit generally including a vacuum fluorescent display and the like. In recent years, the screen of such a liquid crystal display device increases in size, and even a display device for a more than 50-inch size television is in practical use.

However, since with the increase in size, the power consumption also increases, there is a need for technological development for the realization of low power consumption. At the same time, there is also a need for an increase in light-and-shade contrast so as to improve image quality, a need for structural simplification and ease of mass production so as to reduce cost, and the like.

Of the above needs, in response to the realization of low power consumption, the use of a light-emitting diode or a laser, each having high luminous efficiency, as a light source is considered, and a planar lighting device using a light-emitting diode as a light source is even in practical use already.

For example, Japanese Laid-Open Patent Publication No. 2004-226709 (Patent Document 1) discloses a planar lighting device for, by using a light-guiding sheet that includes a substrate on the whole surface of which successive tubular light guides are arranged and thus devising the formation positions of a plurality of light-emitting openings for emitting a light from the tubular light guides, making approximately uniform the intensity of the light emitted from the whole surface of the substrate. The light emitted from a light source is incident on the end of each tubular light guide, propagates within the tubular light guide while multiple reflected therefrom, and is emitted from the plurality of light-emitting openings formed on the surface of the tubular light guide. The plurality of light-emitting openings are arranged such that the farther from the end, the higher the layout density or the light-emitting opening area rate. Based on this structure, Patent Document 1 realizes a light intensity that requires low power consumption and is uniform.

Further, Japanese Laid-Open Patent Publication No. 2006-134720 (Patent Document 2) discloses a planar lighting device for, by using an optical waveguide arranged in contact with a light-guiding plate and bent multiple times, making approximately uniform the intensity of the light emitted from the light-guiding plate. The light emitted from a light source is incident on the end of the optical waveguide, propagates within the optical waveguide while multiple reflected therefrom, is reflected from a reflection surface within the optical waveguide, and is emitted to the light-guiding plate that contacts the optical waveguide. Based on this structure, Patent Document 2 realizes a light intensity that requires low power consumption and is uniform.

The conventional planar lighting device disclosed in Patent Document 1 is devised such that the farther from the end, the narrower the interval between the light-emitting openings, so as to make the intensity of the emitted light uniform.

Further, the conventional planar lighting device disclosed in Patent Document 2 is devised such that the light propagating within the tubular optical waveguide is reflected from the reflection surface and is emitted, so as to make the intensity of the emitted light uniform.

However, the above-devised structures complicate the designs of the light guides and the optical waveguide, and thus become a cause of increasing the costs of producing the light guides and the optical waveguide.

SUMMARY OF THE INVENTION

Therefore, an object of the present invention is to provide a planar lighting device for balancing low power consumption and low cost with light intensity uniformity by using a simple structure, and to provide a liquid crystal display device using the planar lighting device.

The present invention is directed to a planar lighting device using a laser light source. To achieve the above object, the planar lighting device of the present invention includes: an optical fiber, of which one end is optically coupled to the laser light source, for propagating, from the one end to other end, a laser light emitted from the laser light source; and a light-guiding plate including a light-guiding section in which a plurality of right prisms of the same shape for extracting the laser light by contacting the optical fiber are arranged parallel to each other in the same direction at equal intervals, and also including a planar section for diffusing the laser light extracted from the light-guiding section and emitting the diffused laser light from one main surface. The optical fiber is bent more than twice to form a plurality of straight line portions arranged parallel to each other at unequal intervals, and the optical fiber and the light-guiding plate are positioned such that the laser light is extracted at equal intervals from each of the plurality of straight line portions.

It is preferable that the light-guiding section is formed such that a plurality of triangular prisms are arranged parallel to each other at equal intervals, each contacting the planar section with any one of side surfaces thereof, and an opposite edge to the side surface contacting the planar section crosses and contacts the optical fiber. It is preferable that the opposite edge to the side surface contacting the planar section is orthogonal to the optical fiber.

Further, the light-guiding section may be formed such that a plurality of triangular prisms are arranged parallel to each other at equal intervals, each contacting the planar section with one bottom surface thereof, and the plurality of triangular prisms are each shaped such that the closer to the other end, at which a light intensity is low, the larger the area of the contact between other bottom surface and the optical fiber. Furthermore, the light-guiding section may be formed such that a plurality of pyramidal light-guiding units are arranged in a two-dimensional manner.

Further, it is preferable that the optical fiber is formed such that, of intervals between two adjacent straight line portions among the plurality of straight line portions, the interval on the one end side is widest such that the closer to the other end, the narrower the interval. However, depending on the purpose, it is also possible that the optical fiber is formed such that, of intervals between two adjacent straight line portions among the plurality of straight line portions, the interval closest to a center of the light-guiding plate is narrowest.

Note that it is preferable that a coating film that allows the laser light to pass therethrough is formed between the optical fiber and the light-guiding section or that adhesive that allows the laser light to pass therethrough adheres the optical fiber to the light-guiding section.

Here, if the laser light source is a light source capable of emitting a linearly polarized laser light and the optical fiber is a polarization-maintaining optical fiber, it is possible that a linearly polarized laser light of which planes of polarization face in the same direction is emitted from the planar section of the light-guiding plate.

Note that, among the plurality of straight line portions, two adjacent straight line portions as a forward path and a return path that propagate the laser light in opposite directions to each other within the optical fiber may be a pair, or the laser light source may be formed using a light source for emitting a red light, a light source for emitting a green light, and a light source for emitting a blue light.

Further, it is possible to form a liquid crystal display device by using the above-described planar lighting device as a backlighting device for illuminating a liquid crystal display panel from a back side.

Based on the present invention, it is possible, efficiently using a laser light, to emit the laser light of which the light intensity requires low power consumption and is uniform. Further, it is easy to reduce the costs of optical design and mass production of an optical fiber and a light-guiding plate, regardless of screen size, due to the simple shapes and the simple structures thereof. Furthermore, a liquid crystal display device used as a backlighting device has a wide color gamut, is capable of performing image display at high brightness, and is capable of being thin and operating with low power consumption. At the same time, it is also possible to reduce cost and significantly improve light utilization efficiency.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1A, 1B, and 1C each are a schematic structural diagram showing a planar lighting device 10 according to a first embodiment of the present invention;

DESCRIPTION OF THE PREFERRED
EMBODIMENTS (First Embodiment)

Figure 1A:
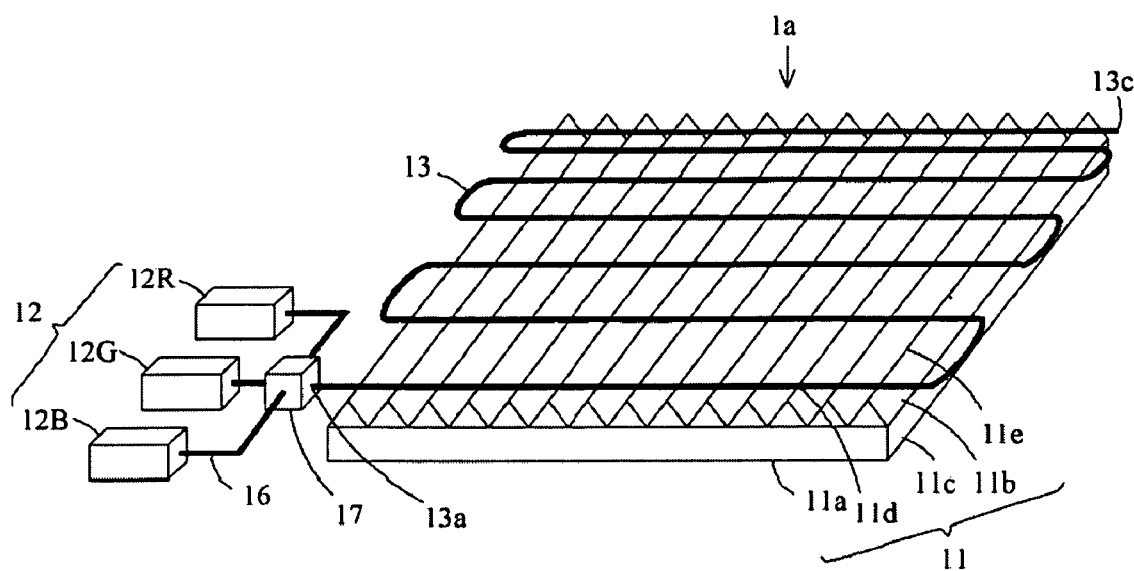

FIGS. 1A, 1B, and 1C each are a schematic structural diagram showing a planar lighting device 10 according to a first embodiment of the present invention. FIG. 1A is a perspective view illustrating the overall structure of the planar lighting device 10. FIG. 1B is a top view of the planar lighting device 10 as viewed from the direction of arrow 1a. FIG. 1C is a 1b-1b cross-sectional view of FIG. 1B. Referring to FIGS. 1A, 1B, and 1C, the elements of the planar lighting device 10 are separately arranged so as to facilitate understanding, but in practice, are provided on a base plate (not shown), within a frame (not shown), or the like and integrally fixed.

The planar lighting device 10 includes a laser light source 12, an optical fiber 13, and a light-guiding plate 11. The laser light source 12 includes an R light source 12R for emitting a red laser light, a G light source 12G for emitting a green laser light, a B light source 12B for emitting a blue laser light, and a light combination section 17 for combining all of these laser lights together. All of the laser lights emitted from the R light source 12R, the G light source 12G, and the B light source 12B are incident on the light combination section 17 via an optical fiber 16. The light combination section 17 combines all of the incident laser lights together and outputs the combined laser lights as one white laser light.

The optical fiber 13, of which one end 13a is optically coupled to the laser light source 12, makes a laser light 14 be mitted from the light combination section 17 incident on the one end 13a and propagates the laser light 14b to an other end 13c. As shown in FIG. 1B, the optical fiber 13 has a structure in which one optical fiber is bent more than twice such that a plurality of straight line portions of the one optical fiber are arranged parallel to each other on a two-dimensional plane. Further, of the intervals ($15a > 15b > 15c > 15d > 15e$ and $15f$) between two adjacent straight line portions, the interval on the one end 13a side, on which the white laser light 14b is incident, is widest such that the closer to the other end 13c side, the narrower the interval ($15a$, $15b$, $15c$, $15d$, $15e$, $15f$).

The light-guiding plate 11 includes a light-guiding section 11b for extracting the laser light 14b by contacting the optical fiber 13, and also includes a planar section 11c for diffusing the laser light 14b extracted from the light-guiding section 11b and emitting the diffused laser light 14b from one main surface 11a. The light-guiding section 11b has a structure in which a plurality of right prisms of the same shape are arranged parallel to each other in the same direction at equal intervals D. In the planar lighting device 10 according to the first embodiment, triangular prisms are used as the right prisms and arranged parallel to each other at equal intervals, each contacting the planar section 11c with any one of the side surfaces thereof. The light-guiding section 11b, in which the opposite edges of the triangular prisms to the side surfaces thereof contacting the planar section 11c are a contact section 11e, extracts the laser light 14b by the contact section 11e and the optical fiber 13 orthogonally contacting each other. Therefore, from each of the plurality of straight line portions of the optical fiber 13, the laser light 14b is extracted at the equal intervals D.

As shown in FIG. 1C, a portion of the laser light 14*b* propagating within the optical fiber 13 is, in the process of propagating from the one end 13*a* to the other end 13*c*, guided as a laser light 14*a* from a contact portion 11*d* of the contact section 11*e* to the light-guiding plate 11 via the light-guiding section 11*b*. That is, the laser light 14*b* propagates within the optical fiber 13 while gradually reducing the light intensity by distributing the laser light 14*a* to the planar section 11*c* from each of the contact portions 11*d*. As a result, the light intensity becomes approximately zero at the other end 13*c* of the optical fiber 13.

The planar lighting device 10 according to the first embodiment has a structure in which the optical fiber 13 is formed such that from the one end 13*a* side, on which the light intensity is high, to the other end 13*c* side, on which the light intensity is low, the intervals 15*a*, 15*b*, 15*c*, 15*d*, 15*e*, and 15*f* between two adjacent straight line portions gradually become narrower. Based on this structure, it is possible to emit, from the one main surface 11*a* of the light-guiding plate 11, a laser light 14*c* of which the light intensity is uniform over the whole surface.

Figure 2A:
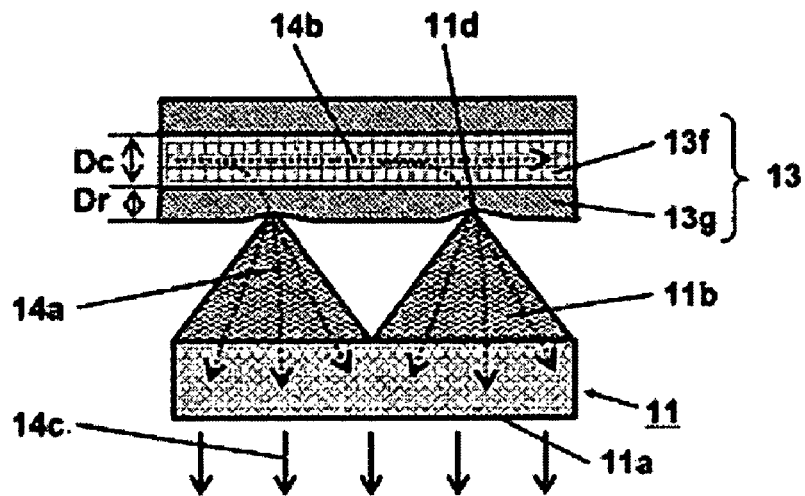
FIGS. 2A, 2B, and 2C each are a schematic cross-sectional view showing a portion of a contact portion 11d in a magnified manner.
Figure 2B:
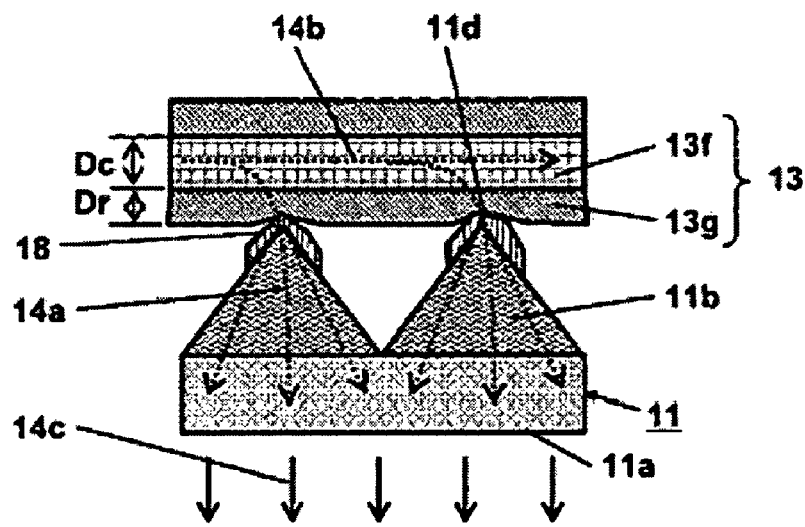
Figure 2C:
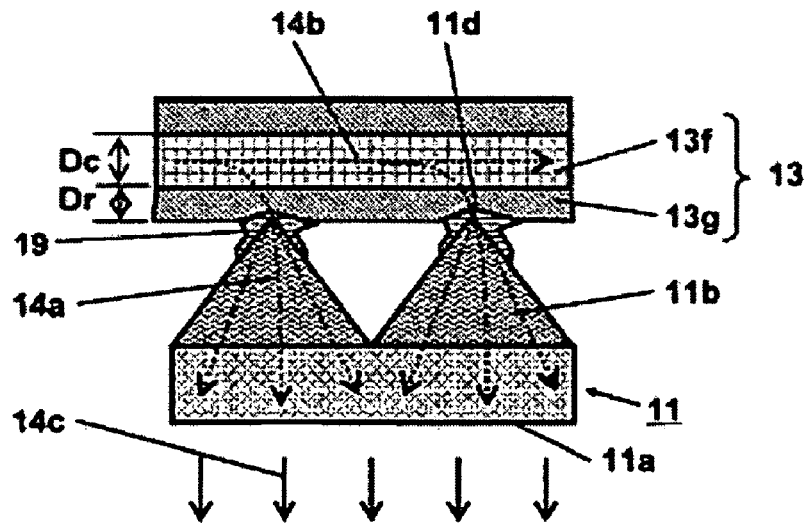

Next, the structure of the light-guiding section 11*b* for extracting the laser light 14*b* by contacting the optical fiber 13 will be described. FIGS. 2A, 2B, and 2C each are a schematic cross-sectional view showing, in a magnified manner, a portion of the contact portion 11*d* at which the light-guiding section 11*b* and the optical fiber 13 of the planar lighting device 10 contact each other.

Referring to FIG. 2A, the optical fiber 13 includes a core 13*f* for propagating the laser light 14*b*, and also includes a cladding 13*g* for confining the laser light 14*b* in the core 13*f*. By contacting the cladding 13*g* with the light-guiding section 11*b*, it is possible to extract a portion of the laser light 14*b* as the laser light 14*a* to the light-guiding section 11*b*. As an example of the optical fiber 13, a diameter Dc of the core 13*f* may be 100 μm and a thickness Dr of the cladding 13*g* may be 12.5 μm.

To efficiently extract the laser light 14*a* from the optical fiber 13 without loss, as shown in FIG. 2B, a coating film 18 that allows the laser light 14*a* to pass therethrough may be formed between the optical fiber 13 and the contact portion 11*d* of the light-guiding section 11*b*. If the refractive index of the coating film 18 is set higher than the refractive index of the cladding 13*g*, it is easy to extract the laser light 14*a*, since the laser light 14*a* concentrates on the contact portion 11*d*. Further, material softer than that of the light-guiding section 11*b*, such as organic optical material, may be used for the coating film 18, whereby it is possible to eliminate the space at the contact portion 11*d* between the optical fiber 13 and the light-guiding section 11*b* and thus improve the adhesion therebetween. Note that the coating film 18 may be formed not only at the contact portion 11*d* but also all over the light-guiding section 11*b*.

Alternatively, referring to FIG. 2C, adhesive 19 that allows the laser light 14*a* to pass therethrough may adhere the optical fiber 13 to the contact portion 11*d* of the light-guiding section 11*b*. If the refractive index of the adhesive 19 is set higher than the refractive index of the cladding 13*g*, it is easy to extract the laser light 14*a*, since the laser light 14*a* concentrates on the contact portion 11*d*. Further, it is possible, by the adhesive 19, to eliminate the space at the contact portion 11*d* between the optical fiber 13 and the light-guiding section 11*b* and thus improve the adhesion therebetween. Note that the adhesive 19 may be applied not only at the contact portion 11*d* but also all over the light-guiding section 11*b*.

As described above, based on the planar lighting device 10 according to the first embodiment of the present invention, it is possible to emit, from the one main surface 11*a* of the light-guiding plate 11, the laser light 14*c* of which the light intensity is uniform. Further, it is easy to produce and arrange the optical fiber 13 and the light-guiding plate 11 due to the simple shapes and the simple structures thereof, and thus it is possible to reduce the costs of optical design and mass production, regardless of screen size.

Note that it is preferable to use a light source capable of emitting a linearly polarized laser light as the laser light source 12, and to use a polarization-maintaining optical fiber as the optical fibers 13 and 16. For example, red and blue semiconductor lasers and an SHG green laser, each of which has a refractive index waveguide structure, may be used as the laser light source 12. In this case, since the linearly polarized laser light 14*b* emitted from the laser light source 12 propagates, remaining linearly polarized, within the polarization-maintaining optical fiber 13, the linearly polarized laser light 14*a* of which the planes of polarization face in the same direction is extracted also from the contact portion 11*d* between the polarization-maintaining optical fiber 13 and the light-guiding section 11*b*. Consequently, it is possible to emit, from the one main surface 11*a* of the light-guiding plate 11, the linearly polarized laser light 14*c* of which the light intensity is uniform and the planes of polarization face in the same direction.

As described above, if it is possible to emit, from the one main surface 11*a* of the light-guiding plate 11, the linearly polarized laser light 14*c* of which the planes of polarization face in the same direction, a polarizing plate is unnecessary on the incident side in the case where the planar lighting device 10 is applied to a liquid crystal display panel, and therefore it is possible to use the emitted light remaining unchanged as it has been polarized. Thus it is possible to improve light utilization efficiency and thus reduce the power consumption and the cost of a liquid crystal display device.

Figure 3A:
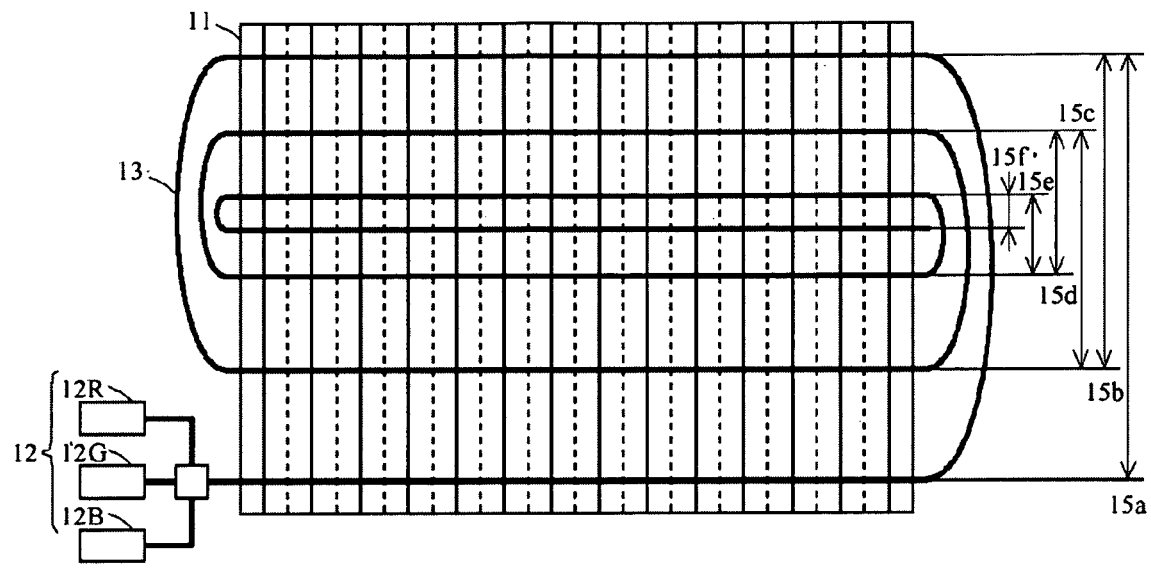
FIGS. 3A, 3B, 3C, 3D, and 3E each are a top view showing another planar lighting device according to the first embodiment of the present invention.
Figure 3B:
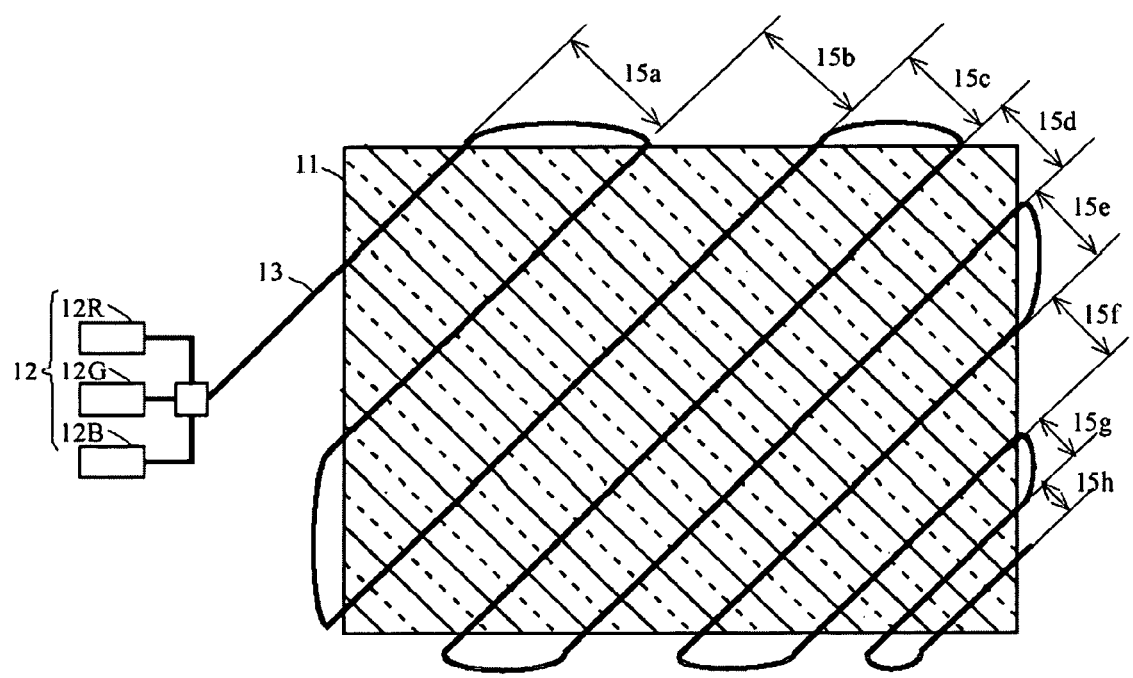

Further, as shown in FIG. 3A, the optical fiber 13 may be arranged in a spiral manner, if the following conditions are satisfied: the above-described structure in which the optical fiber 13 is formed such that from the one end 13*a* side to the other end 13*c* side, the intervals 15*a*, 15*b*, 15*c*, 15*d*, 15*e*, and 15*f* between two adjacent straight line portions gradually become narrower; and the structure in which the optical fiber 13 and the light-guiding section 11*b* are positioned orthogonal to each other. Based on this spiral arrangement, it is possible to increase the curvature radii of the bent portions of the optical fiber 13 and thus reduce the bending stresses. Therefore, it is possible to reduce the light leaks caused by bends. Alternatively, as shown in FIG. 3B, the optical fiber 13 and the light-guiding section 11*b* of the light-guiding plate 11 may each be obliquely positioned.

Figure 3C:
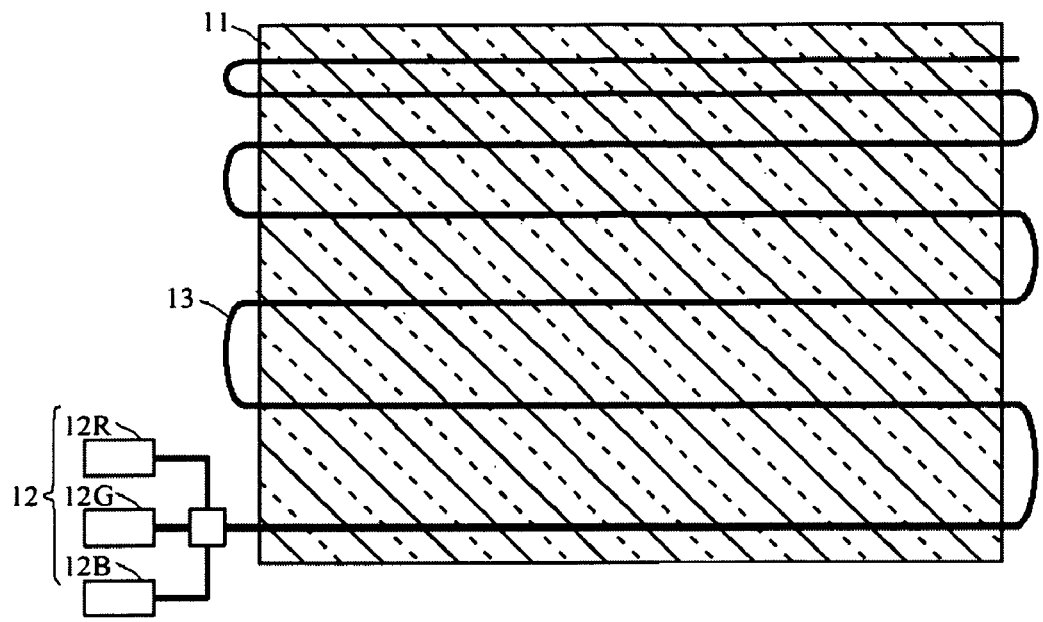
Figure 3D:
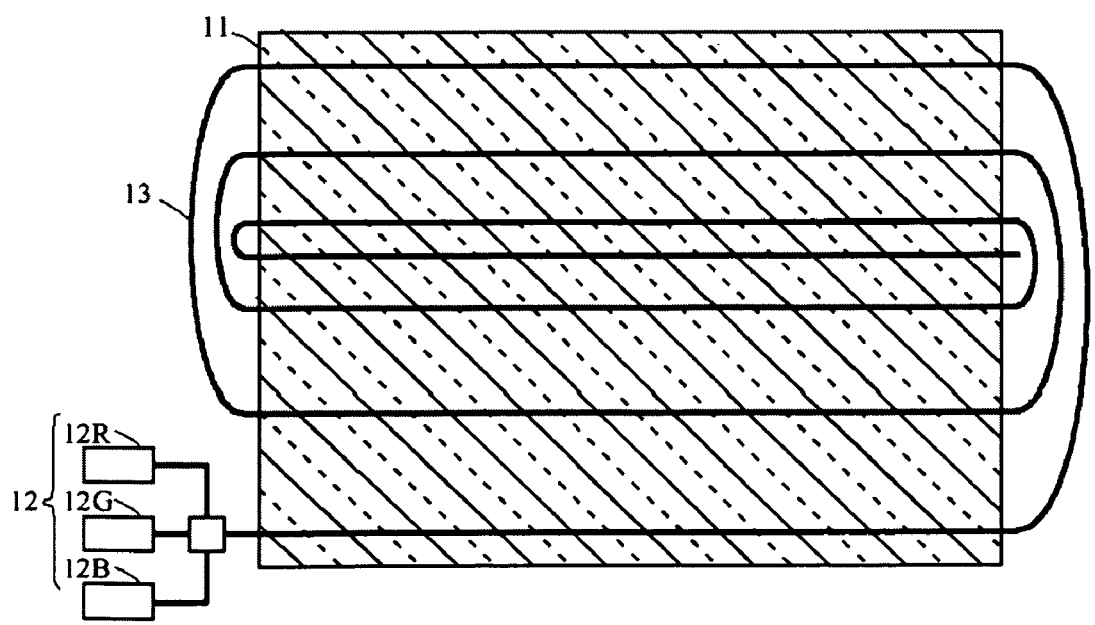
Figure 3E:
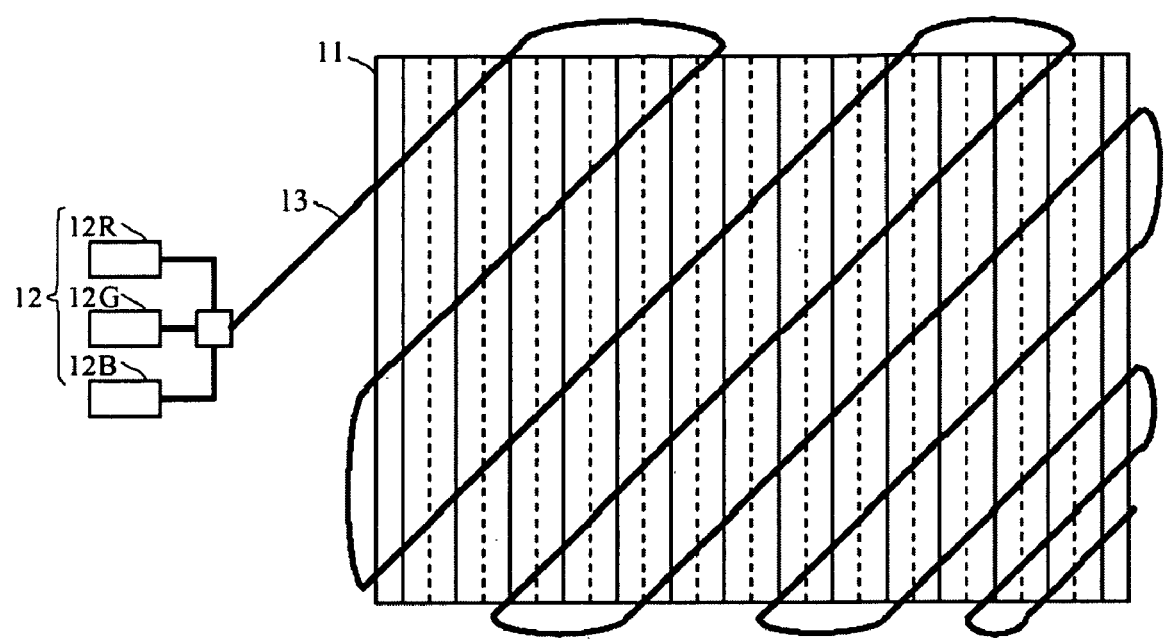

Note that although the optical fiber 13 and the light-guiding section 11*b* are not positioned orthogonal to each other, the structures shown in FIGS. 3C, 3D, and 3E may each be possible as a structure for satisfying the condition that from each of the plurality of straight line portions of the optical fiber 13, the laser light 14*b* is extracted at the equal intervals D. Based on these structures, the distribution of the contact portions 11*d* is random in either the vertical direction or the horizontal direction of the light-guiding section 11*b*, and thus it is possible to improve the uniformity of the distribution of the amount of light of the laser light 14*c* emitted from the one main surface 11*a* of the light-guiding plate 11.

Second Embodiment

Figure 4:
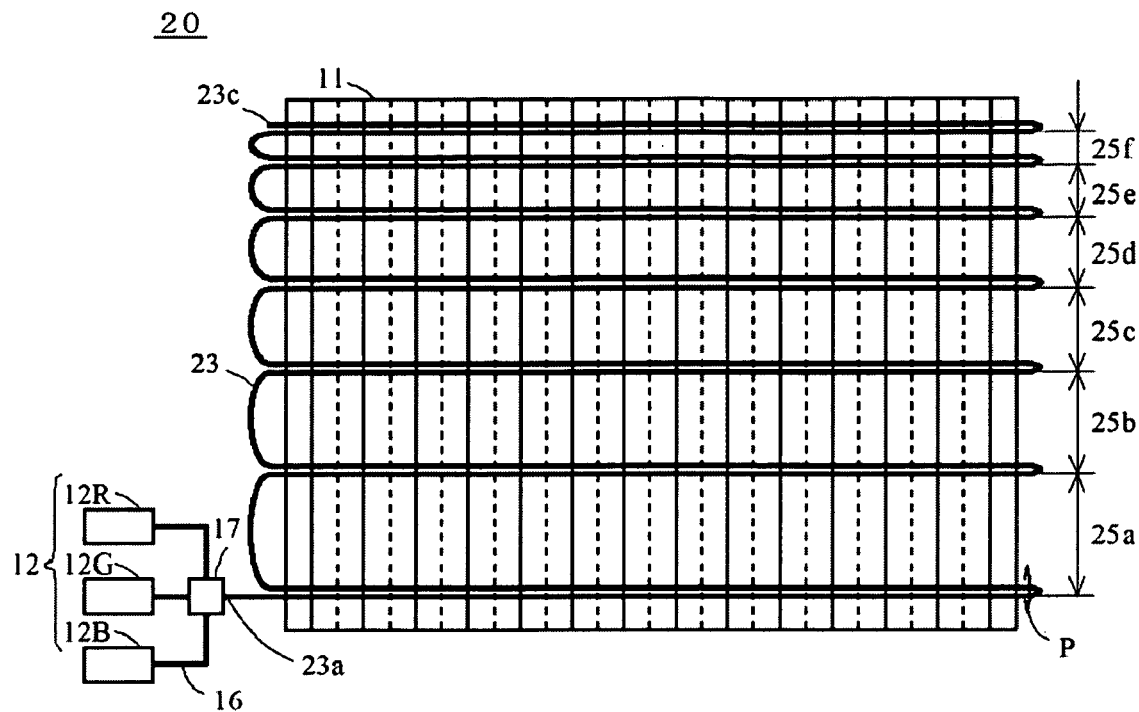
FIG. 4 is a top view showing a planar lighting device 20 according to a second embodiment of the present invention.

FIG. 4 is a top view illustrating the schematic structure of a planar lighting device 20 according to a second embodiment of the present invention. The basic structure of the planar lighting device 20 is the same as that of the planar lighting device 10, except for the method of bending an optical fiber 23. All of the elements of the planar lighting device 20 other than the optical fiber 23 are similar to those of the planar lighting device 10, and therefore will be denoted by the same reference numerals and will not be described.

The optical fiber 23, of which one end 23*a* is optically coupled to the laser light source 12, makes the laser light 14*b* emitted from the light combination section 17 incident on the one end 23*a* and propagates the laser light 11*b* to an other end 23*c*. As shown in FIG. 4, the optical fiber 23 has a structure in which one optical fiber is bent more than twice such that a plurality of straight line portions of the one optical fiber are arranged parallel to each other on a two-dimensional plane, in such a manner that a plurality of straight line pairs P are formed by each bringing two adjacent straight line portions that make one round trip by bending a portion of the one optical fiber once close to each other. Further, of the intervals (25*a*, 25*b*, 25*c*, 25*d*, 25*e*, and 25*f*) between two adjacent straight line pairs P, the interval on the one end 23*a* side, on which the white laser light 14*b* is incident, is widest such that the closer to the other end 23*c* side, the narrower the interval (25*a*>25*b*>25*c*>25*d*>25*e*>25*f*).

The reason for providing the above-described straight line pairs P will be described. As described above, the laser light 14*b* propagates within the optical fiber 23 while gradually reducing the light intensity from the one end 23*a* to the other end 23*c*. Therefore, as in the planar lighting device 10 (see FIG. 1B), due to the structure in which a straight line portion through which a laser light flows from left to right and a straight line portion through which a laser light flows from right to left are alternately arranged at wide intervals (15*a*, 15*b*, 15*c*, 15*d*, 15*e*, and 15*f*), the distribution of the amount of light of the laser light 14*c* emitted from the one main surface 11*a* of the light-guiding plate 11 may be uneven.

Figure 5:
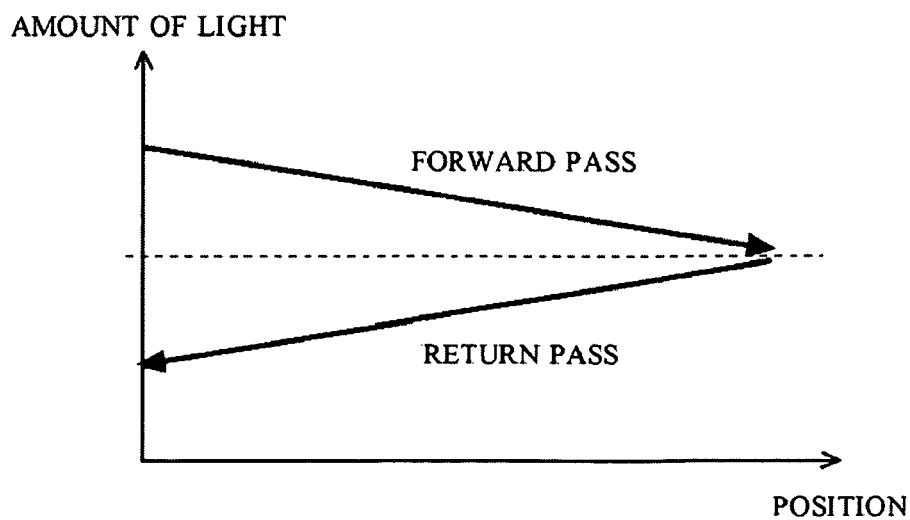
FIG. 5 is a diagram illustrating the amount of light emitted from an optical fiber 23 of the planar lighting device 20.

In response, the planar lighting device 20 eliminates the unevenness of the distribution of the amount of light by the following method: the straight line portion (a forward path) through which a laser light flows from left to right and the straight line portion (a return path) through which a laser light flows from right to left are brought close to each other such that the amount of light extracted from the contact portion 11*d* of the forward path and the amount of light extracted from the corresponding contact portion 11*d* of the return path are combined together. Consequently, it is possible to cancel the reduction of the light intensities and thus obtain uniform laser lights throughout a straight line pair P. FIG. 5 is a graph illustrating the amount of light emitted from the forward path and the return path of the straight line pair P, based on the positions on the light-guiding plate 11.

As described above, based on the planar lighting device 20 according to the second embodiment of the present invention, it is possible to emit, from the one main surface 11*a* of the light-guiding plate 11, the laser light 14*c* of which the light intensity is more uniform. Further, it is easy to produce and arrange the optical fiber 23 and the light-guiding plate 11 due to the simple shapes and the simple structures thereof, and thus it is possible to reduce the costs of optical design and mass production, regardless of screen size.

Third Embodiment

Figure 6A:
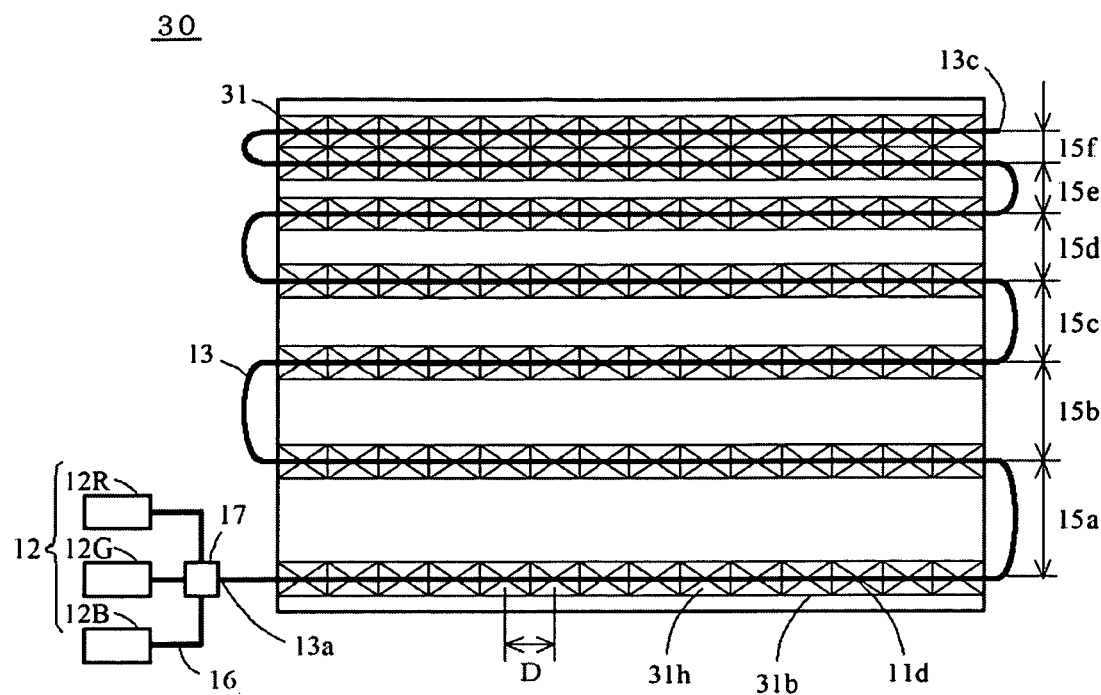
FIG. 6A is a top view showing a planar lighting device 30 according to a third embodiment of the present invention.
Figure 6B:
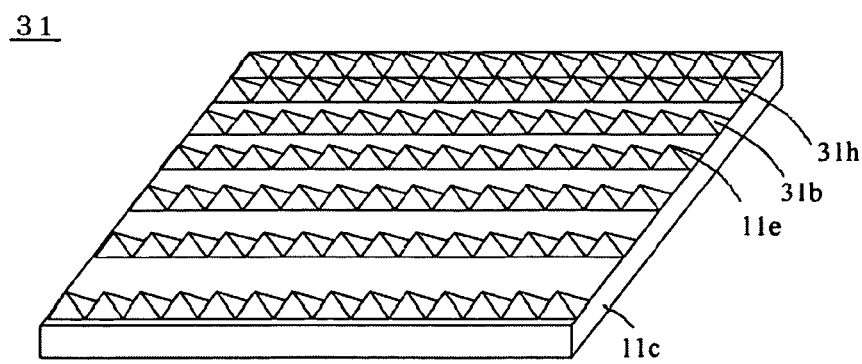
FIG. 6B is a perspective view showing the shape of a light-guiding plate 31.

FIGS. 6A and 6B each are a schematic structural diagram showing a planar lighting device 30 according to a third embodiment of the present invention. FIG. 6A is a top view illustrating the overall structure of the planar lighting device 30. FIG. 6B is a perspective view showing the shape of a light-guiding plate 31. The basic structure of the planar lighting device 30 is the same as that of the planar lighting device 10, except for the shape of a light-guiding section 31*b* of the light-guiding plate 31. All of the elements of the planar lighting device 30 other than the light-guiding section 31*b* are similar to those of the planar lighting device 10, and therefore will be denoted by the same reference numerals and will not be described.

The light-guiding plate 31 includes the light-guiding section 31*b* for extracting the laser light 14*b* by contacting the optical fiber 13, and also includes a planar section 11*c* for diffusing the laser light 14*b* extracted from the light-guiding section 31*b* and emitting the diffused laser light 14*b* from one main surface 11*a*. The light-guiding section 31*b* is formed such that, of the above-described light-guiding section 11*b*, only the contact portion 11*d* contacting the optical fiber 13 is left as a light-guiding unit 31*h*. Referring to FIG. 6B, the light-guiding unit 31*h* is formed into a quadrangular pyramid. Since the light-guiding unit 31*h* is pyramidally formed as described above, the divergent angle of the guided laser light 14*b* is restricted within the apex angle of the pyramid. Therefore, the light intensity of the laser light 14*c* emitted from the one main surface 11*a* of the light-guiding plate 31 may be set high in the direction perpendicular to the one main surface 11*a* and set low in the direction parallel to the one main surface 11*a*, whereby it is possible to control the angular distribution of the light intensity. Note that the shape of the light-guiding unit 31*h* may be a triangular prism.

Fourth Embodiment

Figure 7A:
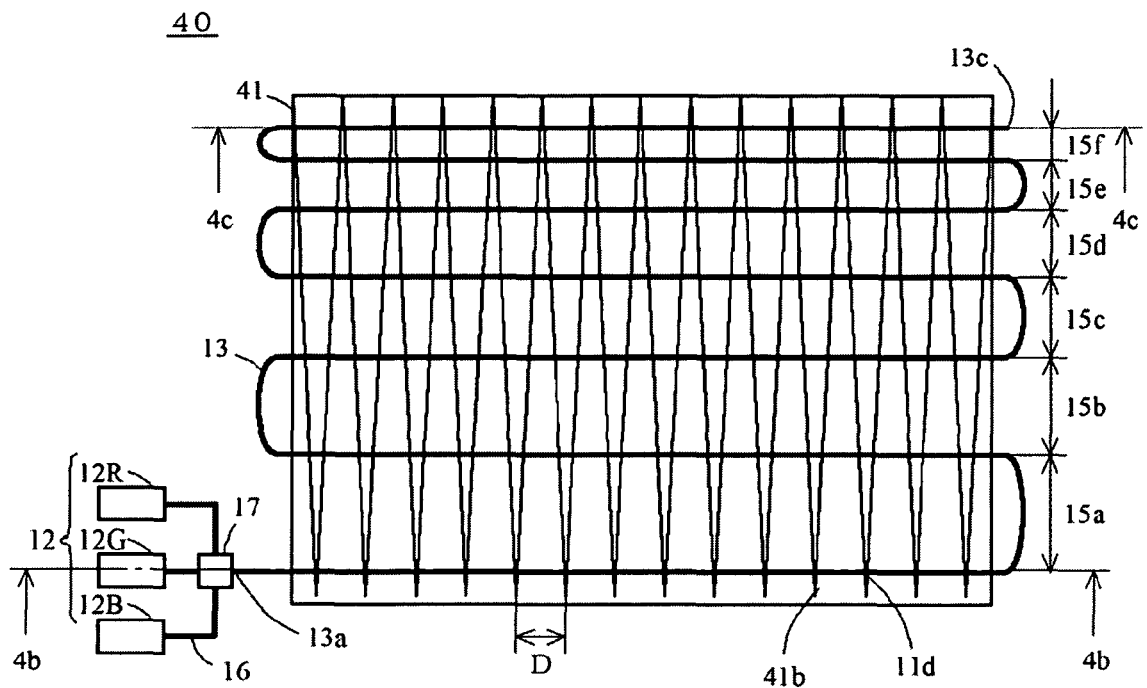
FIG. 7A is a top view showing a planar lighting device 40 according to a fourth embodiment of the present invention.
Figure 7B:
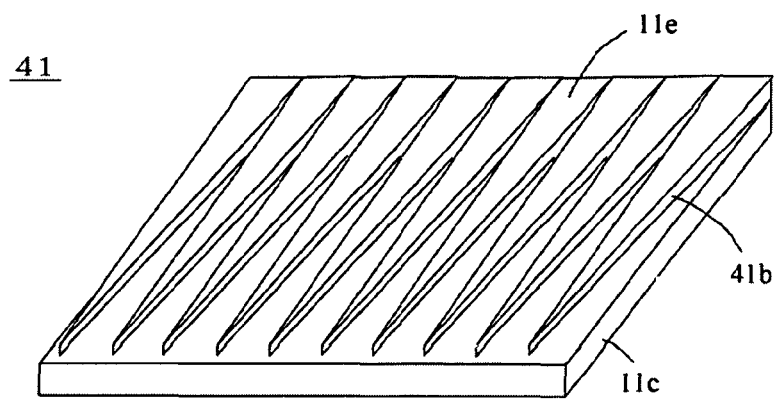
FIG. 7B is a perspective view showing the shape of a light-guiding plate 41.

FIGS. 7A and 7B each are a schematic structural diagram showing a planar lighting device 40 according to a fourth embodiment of the present invention. FIG. 7A is a top view illustrating the overall structure of the planar lighting device 40. FIG. 7B is a perspective view showing the shape of a light-guiding plate 41. The basic structure of the planar lighting device 40 is the same as that of the planar lighting device 10, except for the shape of a light-guiding section 41*b* of the light-guiding plate 41. All of the elements of the planar lighting device 40 other than the light-guiding section 41*b* are similar to those of the planar lighting device 10, and therefore will be denoted by the same reference numerals and will not be described.

The light-guiding plate 41 includes the light-guiding section 41*b* for extracting the laser light 14*b* by contacting the optical fiber 13, and also includes a planar section 11*c* for diffusing the laser light 14*b* extracted from the light-guiding section 41*b* and emitting the diffused laser light 14*b* from one main surface 11*a*. The light-guiding section 41*b* has a structure in which a plurality of right prisms of the same shape are arranged parallel to each other in the same direction at equal intervals D. In the planar lighting device 40 according to the fourth embodiment, triangular prisms are used as the right prisms and arranged parallel to each other at equal intervals, each contacting the planar section 11*c* with one bottom surface thereof. The light-guiding section 41*b*, in which the other bottom surfaces not contacting the planar section 11*c* are a contact section 11*e*, extracts the laser light 14*b* by the contact section 11*e* and the optical fiber 13 orthogonally contacting each other by a surface. At this time, it is preferable that the triangular prisms are each shaped such that the closer to the other end 13*c*, at which the light intensity is low, the larger the area of the contact between the contact section 11*e* and the optical fiber 13.

Figure 7C:
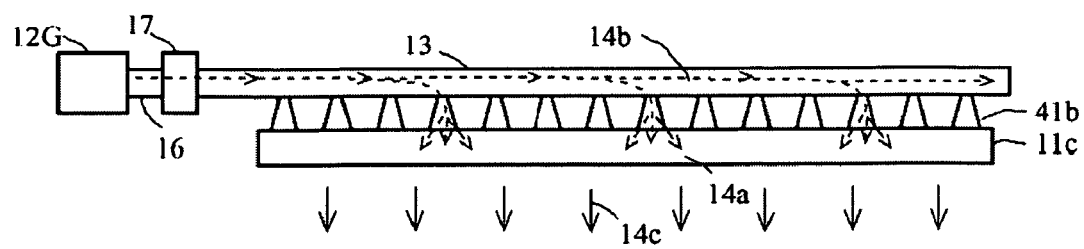
FIGS. 7C and 7D each are a cross-sectional view showing the planar lighting device 40 according to the fourth embodiment of the present invention.
Figure 7D:
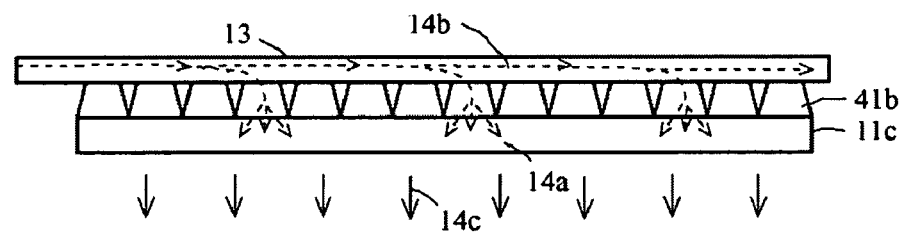

FIG. 7C is a 4b-4b cross-sectional view of FIG. 7A. FIG. 7D is a 4c-4c cross-sectional view of FIG. 7A. In a straight line portion close to the laser light source 12, the light intensity of the laser light 14b propagating within the optical fiber 13 is high, while the area of the contact portion 11d is small (FIG. 7C). On the other hand, in a straight line portion far from the laser light source 12, the light intensity of the laser light 14b propagating within the optical fiber 13 is low, while the area of the contact portion 11d is large (FIG. 7D).

Therefore, if the intervals (15a, 15b, 15c, 15d, 15e, and 15f) between two adjacent straight line portions of the optical fiber 13 and the shape of the light-guiding section 41b are appropriately set, it is possible to emit, from the one main surface 11a of the light-guiding plate 41, the laser light 14c of which the light intensity is more uniform. Further, since the optical fiber 13 contacts the light-guiding section 41b by a surface, it is possible to make the strain on the optical fiber 13 smaller than in the cases of the planar lighting devices 10 through 30, in each of which the optical fiber contacts the light-guiding section by a line or a point.

Other Embodiments

In the first through fourth embodiments, the shapes and the arrangements of the optical fiber and the light-guiding plate are determined so as to emit, from the one main surface of the light-guiding plate, the laser light of which the light intensity is uniform. That is, however, if the shapes and the arrangements of the optical fiber and the light-guiding plate are ingeniously devised, it is possible to freely adjust the distribution of the amount of light in the light-guiding plate.

Figure 8:
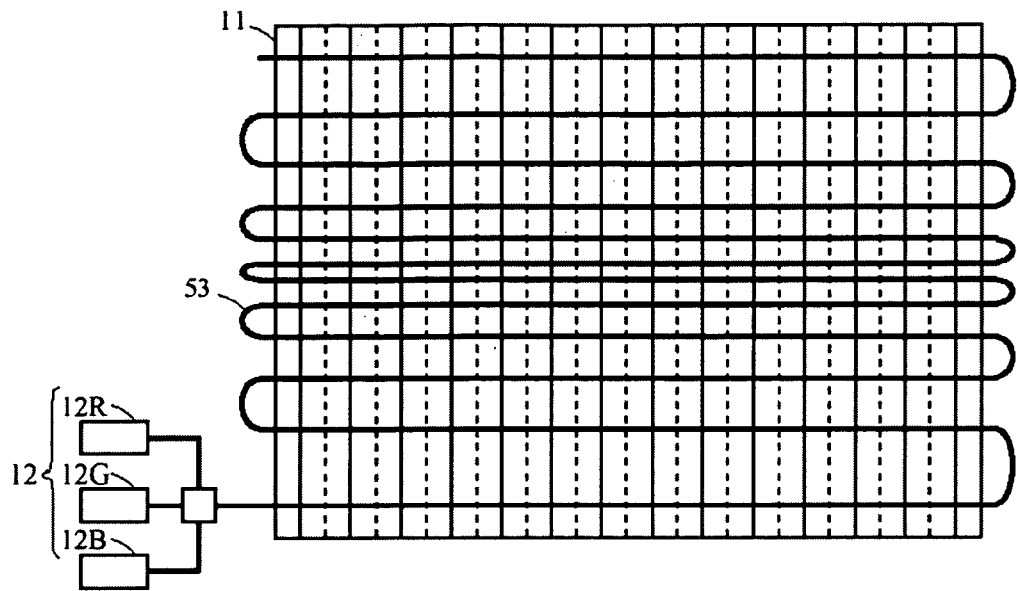
FIGS. 8 and 9 are top views showing planar lighting devices 50 and 60, respectively, according to other embodiments of the present invention.
Figure 9:
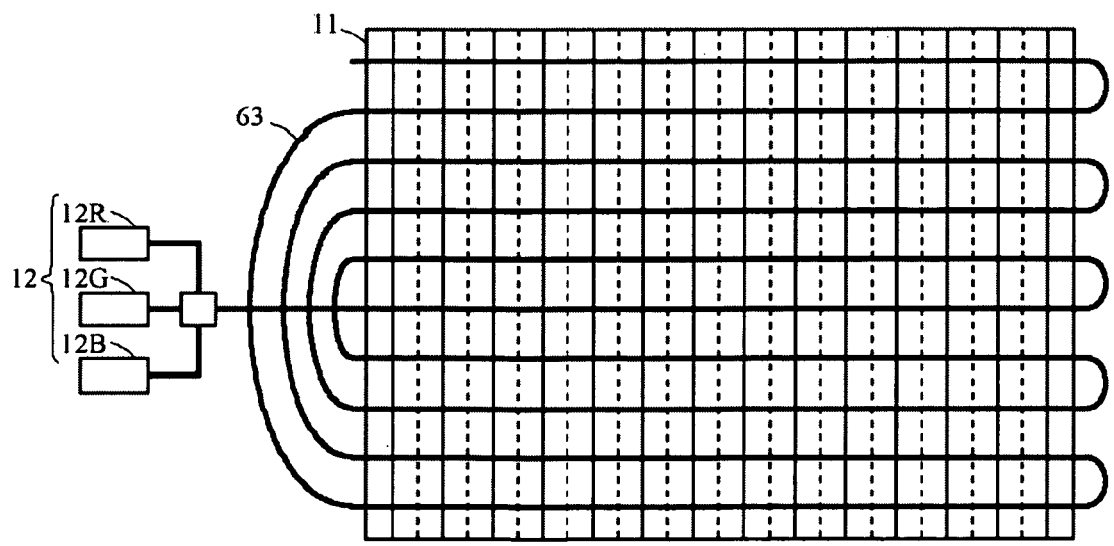

In response, the structure of a planar lighting device, likely to be used for energy conservation measures in the future, that includes a light-guiding plate around the center of which is brightest is devised. FIGS. 8 and 9 show examples of such a planar lighting device.

In a planar lighting device 50 of FIG. 8, an optical fiber 53 is formed such that, of the intervals between two adjacent straight line portions, the interval in the center portion of the light-guiding plate 11 is narrowest, and thus, the further outside of the light-guiding plate 11, the gradually wider the interval is. In a planar lighting device 60 of FIG. 9, by using the feature that the laser light 14b propagates within an optical fiber 63 while gradually reducing the light intensity from the one end to the other end, the laser light 14b is inputted to the center of the light-guiding plate 11 and the optical fiber 63 is arranged in an alternate manner toward the outside of the light-guiding plate 11.

(Example Structure of a Liquid Crystal Display Device Using the Planar Lighting Device)

Figure 10:
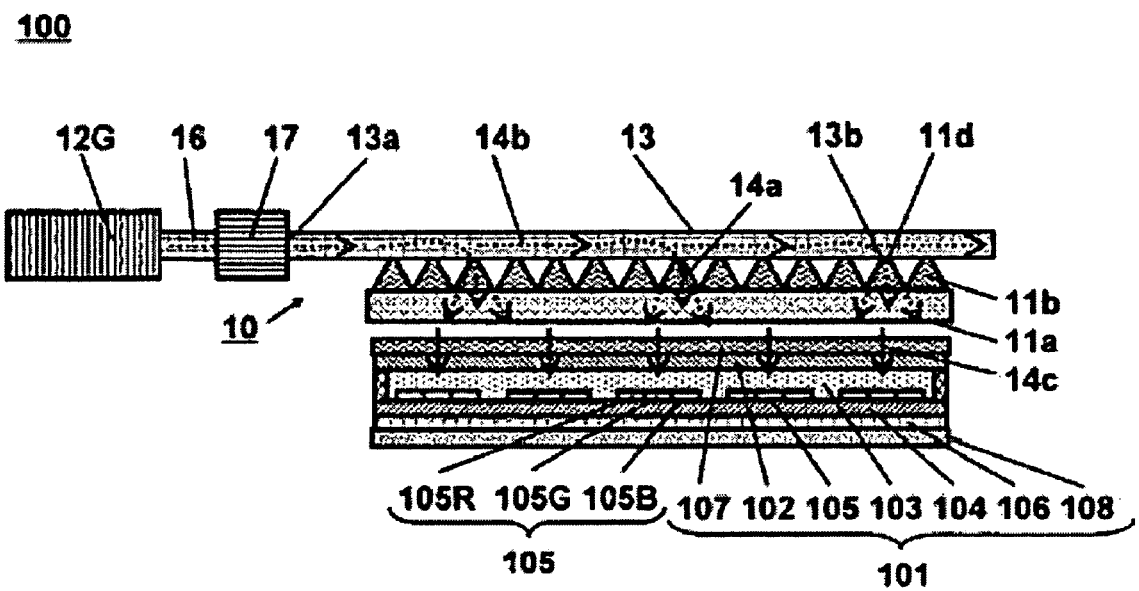
FIG. 10 is an example structure of a liquid crystal display device using the planar lighting device of the present invention.

FIG. 10 is a cross-sectional view showing the schematic structure of a liquid crystal display device 100 using the planar lighting device of the present invention as a backlighting device. The liquid crystal display device 100 includes a liquid crystal display panel 101 and a backlighting device 10 for illuminating the liquid crystal display panel 101 from the back side.

Here, the liquid crystal display panel 101 employs a transmissive or semi-transmissive structure, e.g., a TFT active matrix structure. In the display area, a large number of pixels are provided, each of which is a pixel 105 that includes a red pixel section (R subpixel) 105R, a green pixel section (G subpixel) 105G, and a blue pixel section (B subpixel) 105B and is driven by a TFT. A liquid crystal layer 103 is provided between glass substrates 102 and 104, and a TFT (not shown) for driving the liquid crystal layer 103 is formed on either one of the glass substrates 102 and 104. 106 is an emitting side polarizing film, and 107 is an incident side polarizing film. The liquid crystal display panel 101 has a conventional structure, and therefore the structure thereof will not be described in further detail.

Incidentally, the laser light 14c emitted from the backlighting device 10 is a white laser light into which RGB laser lights are combined. The laser light 14c having passed through the incident side polarizing film 107 of the liquid crystal display panel 101 is linearly polarized. The liquid crystal layer 103 is driven by the TFT, and the TFT switches the lights emitted from the pixel 105 by switching the planes of polarization of the laser light 14c. At this time, the TFT of the pixel 105 may operate in synchronization with the scanning of the laser light 14c, whereby it is possible to display a desired image.

Therefore, based on the above-described structure, it is possible to realize a liquid crystal display device having a wide color gamut, high brightness, and high quality. Further, since a laser light source has high luminous efficiency, it is also possible to reduce power consumption. Furthermore, if the planes of polarization of a laser light are maintained by using a laser light source for emitting a linearly polarized laser light and a polarization-maintaining optical fiber, the incident side polarizing film 107 is unnecessary, and thus it is possible to reduce cost and also significantly improve light utilization efficiency.

Note that in the liquid crystal display device 100 of FIG. 10, to increase the display field of view by diffusing the laser light 14c, a diffuser 108 is provided adjacent to the emitting side polarizing film 106 of the liquid crystal display panel 101. It is preferable that the diffuser 108 is a diffuser for causing large forward light scattering and small backward light scattering. Consequently, the diffuser 108 scatters the laser light, widely expanding the laser light forward, and accordingly, the display field of view is increased such that the liquid crystal display device 100 can be viewed from oblique angles. Therefore it is possible to improve the image display quality of the liquid crystal display device 100. Note that to increase the field of view, rows of microlenses at least on a pixel-by-pixel basis may be provided immediately behind rows of pixels or provided adjacent to a polarizing film of the liquid crystal display panel. Consequently, it is possible, by the microlenses, to scatter in all directions the laser light that travels in a straight line from the one main surface 11a of the light-guiding plate 11 and then is emitted under the control of the pixels 105 of the liquid crystal display panel 101, and thus it is possible to increase the image display field of view.

While the invention has been described in detail, the foregoing description is in all aspects illustrative and not restrictive. It is understood that numerous other modifications and variations can be devised without departing from the scope of the invention.

What is claimed is:

1. A planar lighting device using a laser light source, comprising:
    an optical fiber, of which one end is optically coupled to the laser light source, for propagating, from the one end to another end, a laser light emitted from the laser light source; and
    a light-guiding plate including a light-guiding section in which a plurality of right prisms of a same shape for extracting the laser light by contacting the optical fiber are arranged parallel to each other in a same direction at equal intervals, and also including a planar section for diffusing the laser light extracted from the light-guiding section and emitting the diffused laser light from one main surface, wherein the optical fiber being bent more than twice to form a plurality of straight line portions arranged in a parallel configuration with respect to each other and with an interval being formed between any two straight lines portions of the plurality of straight line portions, each interval being unequal in width with respect to any other interval, the optical fiber and the light-guiding plate being positioned such that the laser light is extracted at equal intervals from each of the plurality of straight line portions, and the optical fiber is formed such that, of the intervals between any two adjacent straight line portions of the plurality of straight line portions, an interval on a one end side of the optical fiber is widest of the plurality of intervals, and an interval on the other end side of the optical fiber is the narrowest of the plurality of intervals, wherein the intervals become narrower when moving from the one end side of the optical fiber to the other end side of the optical fiber.

2. The planar lighting device according to claim 1,
wherein the light-guiding section is formed such that a plurality of triangular prisms are arranged parallel to each other at equal intervals, each triangular prism contacting the planar section with any one of side surfaces thereof, and an opposite edge to a side surface contacting the planar section crosses and contacts the optical fiber.

3. The planar lighting device according to claim 2,
wherein the opposite edge to the side surface contacting the planar section is orthogonal to the optical fiber.

4. The planar lighting device according to claim 1,
wherein the light-guiding section is formed such that a plurality of triangular prisms are arranged parallel to each other at equal intervals, each triangular prism contacting the planar section with one bottom surface thereof, and the plurality of triangular prisms are shaped such that the closer each is to the other end, at which a light intensity is low, the larger an area of the contact between another bottom surface and the optical fiber.

5. The planar lighting device according to claim 1,
wherein the light-guiding section is formed such that a plurality of pyramidal light-guiding units are arranged in a two-dimensional manner.

6. The planar lighting device according to claim 1,
wherein the optical fiber is formed such that, of the intervals between any two adjacent straight line portions of the plurality of straight line portions, an interval closest to a center of the light-guiding plate is narrowest.

7. The planar lighting device according to claim 1,
wherein a coating film that allows the laser light to pass therethrough is formed between the optical fiber and the light-guiding section.

8. The planar lighting device according to claim 1,
wherein adhesive that allows the laser light to pass therethrough adheres the optical fiber to the light-guiding section.

9. The planar lighting device according to claim 1,
wherein the laser light source is a light source configured to emit a linearly polarized laser light,
wherein the optical fiber is a polarization-maintaining optical fiber, and
wherein a linearly polarized laser light of which planes of polarization face in a same direction is emitted from the planar section of the light-guiding plate.

10. The planar lighting device according to claim 1,
wherein, among the plurality of straight line portions, two adjacent straight line portions as a forward path and a return path that propagate the laser light in opposite directions to each other within the optical fiber are a pair.

11. The planar lighting device according to claim 1,
wherein the laser light source is formed using a light source for emitting a red light, a light source for emitting a green light, and a light source for emitting a blue light.

12. A liquid crystal display device comprising:
a liquid crystal display panel; and
a backlighting device for illuminating the liquid crystal display panel from a back side, and
using the planar lighting device according to claim 1 as the backlighting device.

13. The planar lighting device according to claim 1,
wherein the narrowing of the intervals between any two adjacent straight line portions from the one end of the optical fiber to the other end of the optical fiber is gradual and constant throughout the length of the fiber.

\* \* \* \* \*